(12) United States Patent
Huang et al.

(10) Patent No.: US 10,432,624 B2
(45) Date of Patent: Oct. 1, 2019

(54) IDENTITY VERIFICATION METHOD, TERMINAL, AND SERVER

(71) Applicant: Tencent Technology (Shenzhen) Company Limited, Shenzhen (CN)

(72) Inventors: Feiyue Huang, Shenzhen (CN); Jilin Li, Shenzhen (CN); Guofu Tan, Shenzhen (CN); Xiaoli Jiang, Shenzhen (CN); Dan Wu, Shenzhen (CN); Junwu Chen, Shenzhen (CN); Jianguo Xie, Shenzhen (CN); Wei Guo, Shenzhen (CN); Yihui Liu, Shenzhen (CN); Jiandong Xie, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 184 days.

(21) Appl. No.: 15/632,143

(22) Filed: Jun. 23, 2017

(65) Prior Publication Data

US 2017/0295177 A1    Oct. 12, 2017

Related U.S. Application Data

(63) Continuation of application No. PCT/CN2016/081489, filed on May 10, 2016.

(30) Foreign Application Priority Data

May 21, 2015   (CN) .......................... 2015 1 0264333

(51) Int. Cl.
*H04L 29/00* (2006.01)
*H04L 29/06* (2006.01)
(Continued)

(52) U.S. Cl.
CPC .......... *H04L 63/0861* (2013.01); *G06F 21/32* (2013.01); *G06K 9/00221* (2013.01);
(Continued)

(58) Field of Classification Search
CPC ............. H04L 63/0861; H04L 63/0823; H04L 63/083; H04L 2463/082; H04L 12/06;
(Continued)

(56) References Cited

U.S. PATENT DOCUMENTS 8,638,939 B1 *   1/2014   Casey ..................... G06F 21/36
                                                              380/277
9,607,137 B2 *   3/2017   Nicholson ............... G06F 21/32
(Continued)

FOREIGN PATENT DOCUMENTS

CN    103870725 A    6/2014
CN    104298909 A    1/2015
CN    104504321 A    4/2015

OTHER PUBLICATIONS

Tencent Technology, ISRWO, PCT/CN2016/081489, Jul. 21, 2016, 8 pgs.
(Continued)

*Primary Examiner* — Don G Zhao
(74) *Attorney, Agent, or Firm* — Morgan, Lewis & Bockius LLP

(57) ABSTRACT

An identity verification method performed at a terminal includes: displaying and/or playing in an audio form action guide information selected from a preset action guide information library, and collecting a corresponding set of action images within a preset time window; performing matching detection on the collected set of action images and the action guide information, to obtain a living body detection result indicating whether a living body exists in the collected set of action images; according to the living body detection result
(Continued)

that indicates that a living body exists in the collected set of action images: collecting user identity information and performing verification according to the collected user identity information, to obtain a user identity information verification result; and determining the identity verification result according to the user identity information verification result.

19 Claims, 7 Drawing Sheets

(51) Int. Cl.
    *G06F 21/32*     (2013.01)
    *G06K 9/00*     (2006.01)
    *H04W 12/06*     (2009.01)

(52) U.S. Cl.
    CPC ..... *G06K 9/00335* (2013.01); *G06K 9/00362* (2013.01); *H04L 63/083* (2013.01); *H04L 63/0823* (2013.01); *G06K 2009/00328* (2013.01); *H04L 2463/082* (2013.01); *H04W 12/06* (2013.01)

(58) Field of Classification Search
    CPC ................ G06F 21/32; G06K 9/00221; G06K 9/00335; G06K 9/00362; G06K 2009/00328; H04W 12/06
    See application file for complete search history.

(56) References Cited

U.S. PATENT DOCUMENTS

| | | | | |
|---|---|---|---|---|
| 10,140,820 | B1* | 11/2018 | Zalewski | G07G 1/0072 |
| 2004/0193413 | A1* | 9/2004 | Wilson | G06F 3/017 |
| | | | | 704/243 |
| 2011/0154444 | A1 | 6/2011 | Sriraghavan et al. | |
| 2013/0080898 | A1* | 3/2013 | Lavian | G06F 3/16 |
| | | | | 715/728 |
| 2013/0167025 | A1* | 6/2013 | Patri | G06F 9/453 |
| | | | | 715/706 |
| 2013/0307856 | A1* | 11/2013 | Keane | G10L 21/10 |
| | | | | 345/473 |
| 2014/0247210 | A1* | 9/2014 | Henderek | G06F 3/02 |
| | | | | 345/156 |
| 2014/0310764 | A1* | 10/2014 | Tippett | G06F 21/31 |
| | | | | 726/1 |
| 2014/0342818 | A1* | 11/2014 | Smith | G06F 3/015 |
| | | | | 463/29 |
| 2015/0012426 | A1* | 1/2015 | Purves | G06Q 30/0623 |
| | | | | 705/41 |
| 2015/0286328 | A1* | 10/2015 | Lee | G06F 3/0412 |
| | | | | 345/173 |
| 2016/0109954 | A1* | 4/2016 | Harris | G06F 3/017 |
| | | | | 345/156 |
| 2016/0188860 | A1* | 6/2016 | Lee | G06F 21/32 |
| | | | | 726/18 |
| 2017/0026831 | A1* | 1/2017 | Jung | H04L 63/08 |
| 2017/0068952 | A1* | 3/2017 | Brockmann | G06Q 20/363 |
| 2017/0180362 | A1* | 6/2017 | Du | G06F 21/32 |
| 2017/0269797 | A1* | 9/2017 | Lavian | H04L 67/10 |
| 2017/0319065 | A1* | 11/2017 | Kimura | A61B 5/684 |
| 2017/0322687 | A1* | 11/2017 | Lavian | G06F 3/0482 |
| 2018/0101236 | A1* | 4/2018 | Aoyama | G06F 3/017 |
| 2018/0293981 | A1* | 10/2018 | Ni | G10L 15/22 |
| 2019/0014228 | A1* | 1/2019 | Kamoi | H04N 1/00411 |

OTHER PUBLICATIONS

Tencent Technology, IPRP, PCT/CN2016/081489, Nov. 21, 2017, 7 pgs.

\* cited by examiner

IDENTITY VERIFICATION METHOD, TERMINAL, AND SERVER

PRIORITY CLAIM AND RELATED APPLICATION

This application is a continuation application of PCT Patent Application No. PCT/CN2016/081489, entitled "IDENTITY VERIFICATION METHOD, TERMINAL, AND SERVER" filed on May 10, 2016, which claims priority to Chinese Patent Application No. 201510264333.X, entitled "IDENTITY VERIFICATION METHOD, TERMINAL, AND SERVER" filed on May 21, 2015, both of which are incorporated by reference in their entirety.

FIELD OF THE TECHNOLOGY

The present disclosure relates to the field of security technologies, and in particular, to an identity verification method, a terminal, and a server.

BACKGROUND OF THE DISCLOSURE

With continuous development of computer technologies, a user can automatically complete various operations with the help of a computer. A user can also remotely manage various services, such as applying for a loan, remotely taking a test, or remote control. Identity verification needs to be performed if a user is to manage various services. A current common identity verification method includes a password verification method, an account and password verification method, a mobile phone verification code verification method, face identification verification, and the like. However, a simple password verification method can be usually only applied to a one-machine application scenario, such as entrance guard control or a computer local password. The account and password verification method is usually applied to an application scenario in which a server needs to be remotely logged in, such as logging in to a social website and logging into to a mail server. An advantage is that anyone that owns the account and password can pass verification. Security is relatively poor. The mobile phone verification code verification method is a relatively poor identity verification means, and usually functions by combining other identity verification methods, or is separately applied to an application scenario that has a relatively poor requirement for security. The face identification verification method can be easily cracked by deceiving a camera by using a face picture, and does not have great security. Therefore, current identity verification methods have relatively poor security and need to be improved immediately.

SUMMARY

According to various implementations disclosed in the present application, an identity verification method, a terminal, and a server are provided.

An identity verification method performed at an electronic device having one or more processors and memory storing a plurality of programs includes:
displaying and/or playing in an audio form action guide information selected from a preset action guide information library, and collecting a corresponding set of action images;
performing matching detection on the collected set of action images and the action guide information, to obtain a living body detection result indicating whether a living body exists in the collected set of action images; and
according to the living body detection result that indicates that a living body exists in the collected set of action images.

A terminal includes memory, a processor, and a plurality of programs stored in the memory, wherein the plurality of programs, when executed by the processor, cause the processor to execute the following steps:
displaying and/or playing in an audio form action guide information selected from a preset action guide information library, and collecting a corresponding set of action images;
performing matching detection on the collected set of action images and the action guide information, to obtain a living body detection result indicating whether a living body exists in the collected set of action images; and
according to the living body detection result that indicates that a living body exists in the collected set of action images:
  collecting user identity information and performing verification according to the collected user identity information, to obtain a user identity information verification result; and
determining the identity verification result according to the user identity information verification result.

A server includes memory, a processor, and a plurality of programs stored in the memory, wherein the plurality of programs, when executed by the processor, cause the processor to execute the following steps:
selecting action guide information from a preset action guide information library;
sending the action guide information to a terminal;
receiving a set of action images returned by the terminal, where the set of action images is collected by the terminal when the action guide information is displayed and/or played in an audio form;
performing matching detection on the set of action images and the action guide information, to obtain the living body detection result indicating whether a living body exists in the collected set of action images;
according to the living body detection result that indicates that a living body exists in the collected set of action images; and
  receiving user identity information collected and sent by the terminal and performing verification according to the collected user identity information, to obtain a user identity information verification result; and
  returning the identity verification result to the terminal.

Details of one or more implementations of the present application are proposed in the following accompanying drawings and descriptions. Other features, objectives, and advantages of the present disclosure become obvious in the specification, the accompanying drawings, and the claims.

BRIEF DESCRIPTION OF THE DRAWINGS

To describe the technical solutions in the implementations of the present application or the existing technology more clearly, the following briefly introduces the accompanying drawings required for describing the implementations or the existing technology. Apparently, the accompanying drawings in the following description show merely some implementations of the present application, and a person of ordinary skill in the art may still derive other drawings from these accompanying drawings without creative efforts.

DESCRIPTION OF EMBODIMENTS

To make an objective, technical solutions, and advantages of the present disclosure clearer, the present disclosure is further described in detail below with reference to accompanying drawings and specific implementations. It should be understood that specific implementations described herein are only used for explaining the present disclosure but are not used for limiting the present disclosure.

Figure 1:
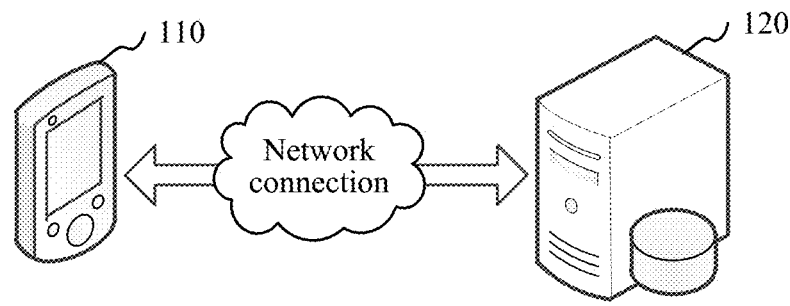
FIG. 1 is a schematic structural diagram of compositions of an identity verification system according to an implementation.

As shown in FIG. 1, in one implementation, an identity verification system 100 is provided, including a terminal 110 and a server 120. The terminal 110 may be a desktop computer and a public query machine, and may also be a mobile terminal such as a mobile phone, a tablet computer, or a personal digital assistant. The server 120 may be one physical server or multiple physical servers.

Figure 2:
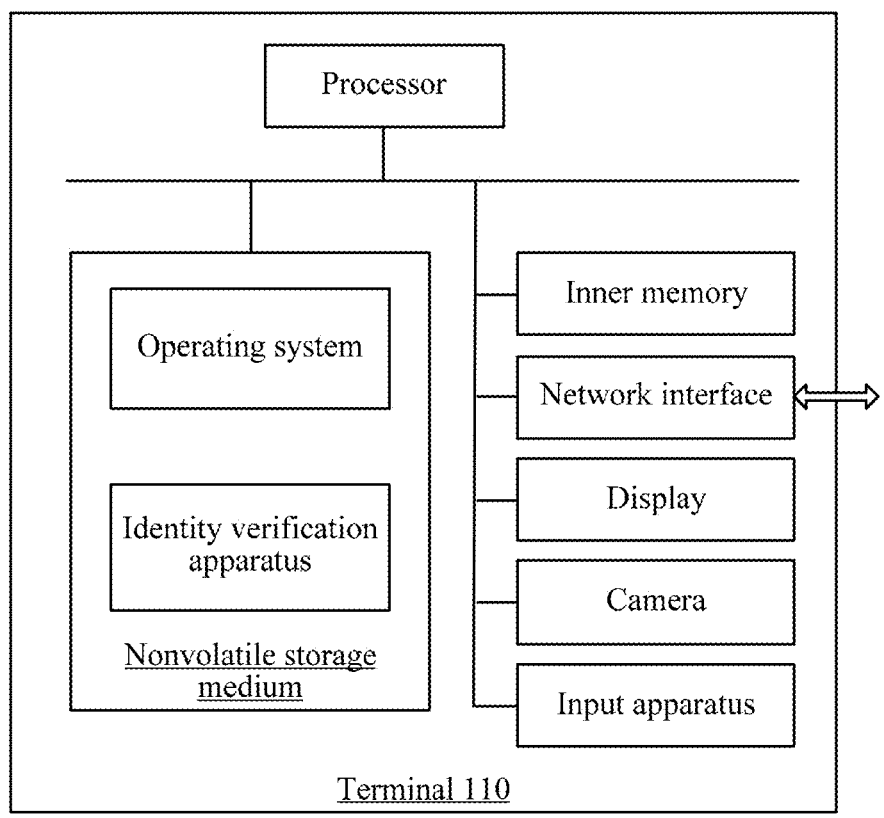
FIG. 2 is a schematic structural diagram of a terminal according to an implementation.

As shown in FIG. 2, in one implementation, a composition structure of the terminal 110 in FIG. 1 is shown in FIG. 2 and includes a processor, an inner memory, a nonvolatile storage medium, a network interface, a display, a camera, and an input apparatus that are connected by using a system bus. An identity verification apparatus is stored in the nonvolatile storage medium of the terminal 110 and is used for implementing an identity verification method. The processor of the terminal 110 is used for providing calculation and control functions and is configured to execute an identity verification method. A display of the terminal 110 may be a liquid crystal display or an electronic ink display. The input apparatus of the terminal 100 may be a touch layer covered on the display, may be a button set on a housing of the terminal 110, or may be an external keyboard, touch panel, or mouse.

Figure 3:
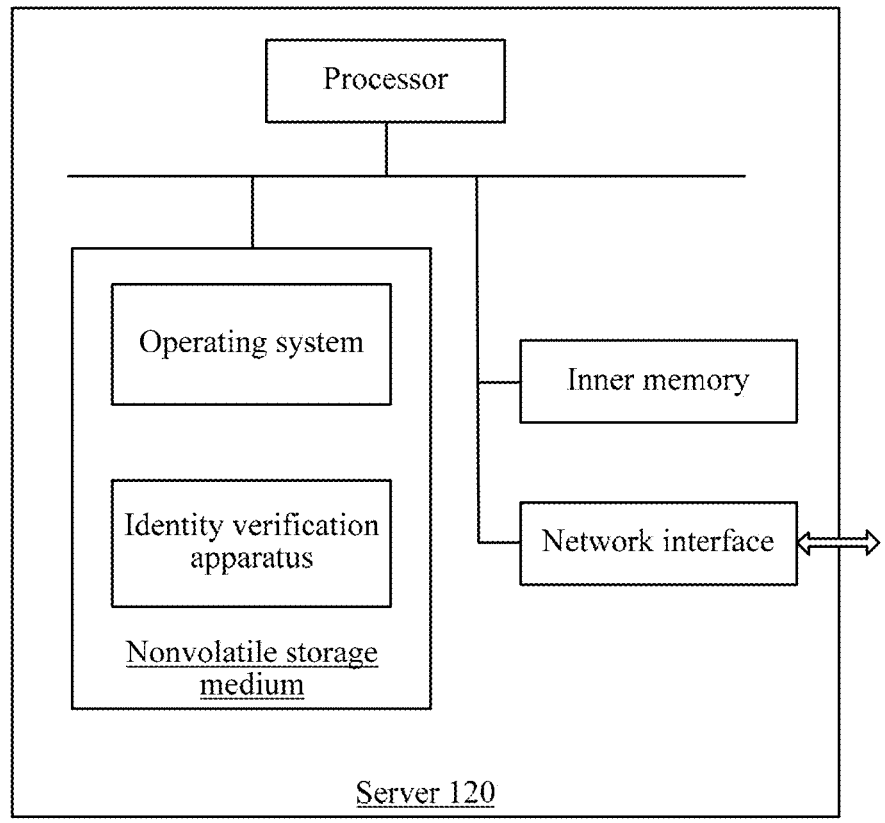
FIG. 3 is a schematic structural diagram of a server according to an implementation.

As shown in FIG. 3, in one implementation, a composition structure of the server 120 in FIG. 1 is shown in FIG. 3 and includes a processor, an inner memory, a nonvolatile storage medium, and a network interface that are connected by using a system bus. An operating system and an identity verification apparatus are stored in the nonvolatile storage medium of the server 120. The identity verification apparatus is used for implementing an identity verification method. The processor of the server 120 is used for providing calculation and control functions and is configured to execute an identity verification method.

Figure 4:
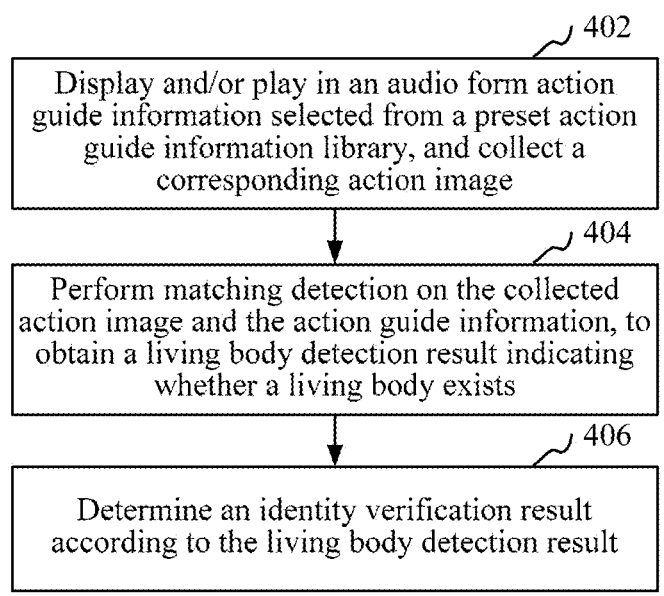
FIG. 4 is a schematic flowchart of an identity verification method according to an implementation.

As shown in FIG. 4, in one implementation, an identity verification method is provided. The method can be applied to the terminal 110 in FIG. 1 and FIG. 2 and can also be applied to the terminal 110 and the server 120 in the identity verification system in FIG. 1. The method specifically includes the following steps:

Step 402: Display and/or play in an audio form action guide information selected from a preset action guide information library, and collect a corresponding set of action images of a user of the terminal within a preset time window.

In some implementations, the preset action guide information library includes various action guide information. A function of the action guide information is guiding a user to make a corresponding action (e.g., a body movement). For example, if the action guide information is "blink your eyes", it indicates that a user is guided to make an action of blinking his eyes. Similar action guide information may also be "blink your left eye and then right eye", "open your mouth", "turn your head", or "stretch out four fingers of yours", to guide a user to make corresponding actions of blinking eyes in a preset order, opening his mouth, turning his head, and stretching out four fingers of his. The action guide information may be randomly selected from the preset action guide information library or may be selected in a confidential selection sequence unbeknown to the user of the terminal 110. The selection sequence is regularly updated. In one implementation, the terminal 110 may receive the action guide information selected from the preset action guide information library and sent by the server 120.

In one implementation, the action guide information includes an action instruction sequence composed of multiple action instruction units. The action instruction unit herein refers to a minimum action guide unit. One action instruction unit indicates an action. For example, ""blink your eyes", "open your mouth", or "turn your head" are separately an action instruction unit. Multiple action instruction units are arranged in sequence to form an action instruction sequence. For example, if one piece of action guide information is an action instruction sequence, specifically "blink your eyes, open your mouth, and turn your head", it indicates that a user needs to make actions of blinking eyes, opening mouth, and turning head in sequence. For another example, the action guide information may be a literal sequence. Each word in the literal sequence is a separate action instruction unit. That the user generates a mouth shape of each word is an action. In this implementation, the action guide information includes an action instruction sequence composed of multiple action instruction units. In this way, a situation in which identity verification is cracked by means of random experiments can be avoided as much as possible, so that a living body detection result is more accurate.

The action guide information may be represented in a visual form, such as in a literal form and in a form of a schematic diagram. The action guide information is played in an audio form. Specifically, audio data of characters or words may be pre-recorded. When the action guide information is played, corresponding audio data in the action guide information is played character by character, or word segmentation may be first performed on the action guide information, and then the action guide information is converted into corresponding audio data by using words as a unit and is played. Certainly, while the action guide information is displayed, the action guide information may be played in an audio form.

While the action guide information is displayed or played, a set of action images corresponding to the action guide information is collected. In some implementations, the action guide information has an associated time window and only images collected within the time window are considered as being part of the set of action images and the terminal stops collecting more images when the time window expires. The action image herein refers to an image that should include an action made by a user according to the action guide information. Images may be collected at a preset time interval within a display and/or play time segment corresponding to one action instruction unit. In some implementations, a mapping relationship is established between an action instruction unit and a corresponding set of images collected within a time segment for future matching analysis between the images and the action requirement of the action instruction unit. An image that is most different from another image collected within the time segment in the collected images or a part of said image is used as the collected set of action images corresponding to the action instruction unit. In one implementation, when movement is detected within view of a camera by means of movement detection, an image is collected by using the camera immediately or after short preset time is waited. The collected image or a part of the collected image is used as the action mages corresponding to the movement.

Step 404: Perform matching detection on the collected set of action images and the action guide information, to obtain a living body detection result indicating whether a living body exists in the collected set of action images.

Matching detection is performed on two objects, to detect whether the two objects match each other. A degree of matching between the two objects may also be detected. If it is detected that the collected set of action images matches the action guide information, it indicates that a living body exists in the collected set of action images, and the living body detection result indicating that a living body exists in the collected set of action images is obtained. If it is detected that the collected set of action images does not match the action guide information, it indicates that a living body does not exist, and the living body detection result indicating that a living body does not exist is obtained.

The living body detection result may take a value from two preset values. For example, one is used for indicating that a living body exists in the collected set of action images, and zero is used for indicating that a living body does not exist. The living body detection result may also be represented by using a matching value indicating a degree of matching between the collected set of action images and the action guide information. If the matching value exceeds a matching value threshold, it indicates that a living body exists in the collected set of action images. If the matching value does not exceed the matching value threshold, it indicates that a living body does not exist. The matching value herein may be represented by using similarity between the action image and a preset action image corresponding to the action guide information or may be represented by using a value after positive correlation is performed on the similarity. The matching value may also be represented by using an Euclidean distance between the action feature extracted from the action image and a preset action feature corresponding to the action guide information, or may be represented by using a value after positive correlation is performed on the Euclidean distance. Positive correlation refers to inputting a function in which an independent variable is positively correlated to a dependent variable and outputting a function result.

In one implementation, step 404 includes: extracting an action feature from the collected set of action images, and performing matching detection on the extracted action feature and a preset action feature corresponding to the action guide information, to obtain the living body detection result whether a living body exists in the collected set of action images. Specifically, similarity between the extracted action feature and the corresponding preset action feature may be calculated. If the similarity is greater than a similarity threshold, it is determined that a living body exists in the collected set of action images, and the living body detection result indicating that a living body exists in the collected set of action images is obtained. If the similarity is less than or equal to a similarity threshold, it is determined that a living body does not exist, and the living body detection result indicating that a living body does not exist is obtained. The extracted action feature herein may be a geometric feature, such as the Euclidean distance, and or may be an algebraic feature, such as a feature matrix.

In one implementation, step 404 includes: sending the collected set of action images to a server, so that the server performs matching detection on the set of action images and the action guide information, to obtain the living body detection result indicating whether a living body exists in the collected set of action images. The collected set of action images may be encrypted and sent to the server.

Step 406: Determine an identity verification result according to the living body detection result.

Figure 6:
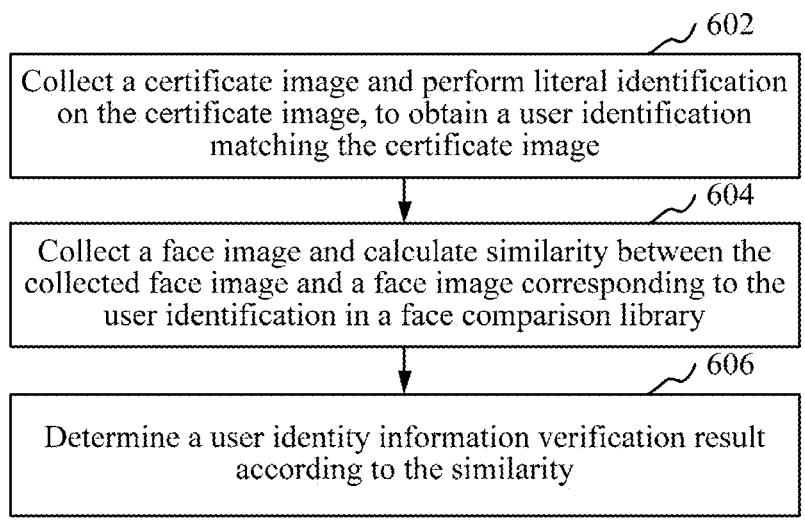
FIG. 6 is a schematic flowchart of a step of collecting user identity information and performing verification according to the collected user identity information, to obtain a user identity information verification result according to an implementation.

Specifically, in one implementation, when the living body detection result indicates that a living body exists in the collected set of action images, the identity verification is passed. In one implementation, when the living body detection result indicates that a living body does not exist, the identity verification fails. In one implementation, the identity verification result may also be obtained according to a combination of the living body detection result and other verification manners. In other words, the identity verification is a binary result indicating the existence of a living body or not. No further identification is required as to, e.g., the information that uniquely identifies the user of the terminal 110. As will be explained below in connection with FIG. 6, the process of granting a user of the terminal 110 to access certain information that is restricted to its authorized user is divided into two stages. The first stage is described above in connection with FIG. 4 during which it is determined whether there is a living body that is initiating a request for accessing such information. If there is no living body behind the request, the terminal 110 and/or the server 120 will not proceed to the second stage during which the user of the terminal 110 is prompted to provide more user identity information as described in FIG. 6. Using such information, a uniqueness of the living body being a user of a service offered through the terminal 110 is determined and the user is granted to access a user account of the service. By doing so, the chance of accidental exposure of the user identity information described in FIG. 6 is minimized because the terminal 110 will not require such information if the determination described in FIG. 4 fails. This two-stage authentication process of a user's identity provides more protection for the service offered by the terminal 110 and/or the server 120 because of the requirement for passing the living body test described in FIG. 4.

In the foregoing identity verification method, a user is guided in a visual and/or sound manner to complete a corresponding action by displaying and/or playing the action guide information selected from the preset action guide information library, so as to collect the corresponding set of action images. Then matching detection is performed on the collected set of action images and the action guide information, to obtain the living body detection result indicating whether a living body exists in the collected set of action images, so as to obtain the identity verification result according to the living body detection result. In this way, a situation of violent cracking by a machine may be avoided by means of living body detection to verify whether a real user is currently performing operations, to make a final identity verification result more accurate and improve security.

In one implementation, the identity verification method further includes: collecting user identity information and performing verification according to the collected user identity information, to obtain a user identity information verification result. Step 406 includes: determining the identity verification result according to the living body detection result and the user identity information verification result.

Specifically, the user identity information refers to information used for proving a user identity, which includes at least one of a user account, a user password, user certificate information, and user biological feature information. The user biological feature information includes face feature information, fingerprint feature information, iris feature information, a palm geometrical shape, and the like. The certificate information includes a certificate number, a name, the date of birth, an issuing authority, a validity period, and the like. A certificate may be specifically an identity card, a driving license, a social guarantee card, a passport, and the like.

Collecting the user identity information may be specifically acquiring the user identity information input by a user. For example, a character string entered in a user account input box is acquired as a user account, and a character string entered in a user password input box is acquired as a user password. For another example, certificate information input in a certificate information input box is acquired. Collecting the user identity information may also be acquiring the user identity information by calling a camera, a sensor, and the like. For example, a certificate image or a face image is acquired by camera scanning, and the fingerprint feature information, the iris feature information, and the like are obtained by sensor scanning.

Verification is performed according to the collected user identity information. Specifically, the collected user identity information may be verified. For example, as regards the certificate information, whether a certificate number meets a preset format and whether current time is within a validity period may be determined.

Verification is performed according to the collected user identity information. Specifically, matching detection may be specifically performed on the collected user identity information and prestored user identity information, to obtain the identity information verification result. For example, as regards the user account and the user password, a prestored password corresponding to the user account may be acquired, and whether the collected user password is the same as the prestored password is determined, to obtain the identity information verification result. The identity information verification result is used for indicating whether verification performed according to the collected user identity information is passed.

In one implementation, the operation of collecting user identity information and performing verification according to the collected user identity information, to obtain a user identity information verification result includes: collecting, by a terminal 110, user identity information and sending the user identity information to a server, so that the server performs verification according to the collected user identity information, to obtain the user identity information verification result. The collected user identity information may be encrypted and sent to the server.

A final identity verification result is obtained by combining the living body detection result and the user identity information verification result. In one implementation, the step of determining the identity verification result according to the user identity information verification result includes: when the living body detection result indicates that a living body exists in the collected set of action images, and the user identity information verification result is that verification is passed, determining that the identity verification result is that verification is passed. In one implementation, the step of determining the identity verification result according to the user identity information verification result includes: when the living body detection result indicates that a living body does not exist, and the user identity information verification result is that verification is passed, determining that the identity verification result is that verification fails. In one implementation, the step of determining the identity verification result according to the user identity information verification result includes: when the living body detection result indicates that a living body does not exist, and the user identity information verification result is that verification is passed, determining that the identity verification result is that verification fails.

In one implementation, the step of determining the identity verification result according to the user identity information verification result includes: receiving the identity verification result returned after the server determines the identity verification result according to the living body detection result and the user identity information verification result.

In one implementation, step 404 and the step of collecting user identity information and performing verification according to the collected user identity information, to obtain a user identity information verification result are preformed asynchronously, and an execution sequence of two steps are not limited. In this implementation, efficiency of an identity verification process is ensured by means of asynchronous processing.

Figure 5:
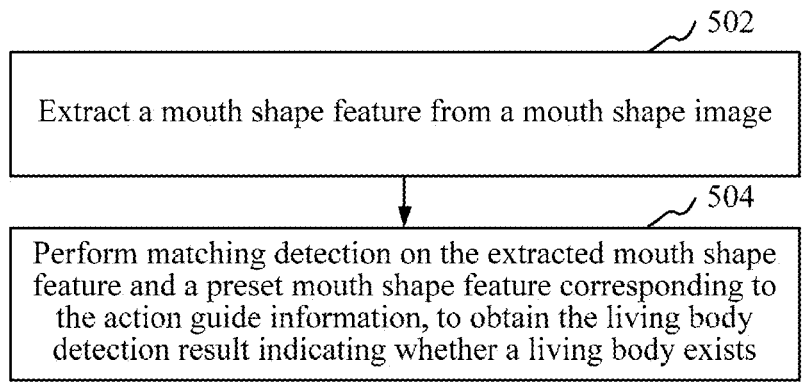
FIG. 5 is a schematic flowchart of a step of performing matching detection on a collected action image and action guide information, to obtain a living body detection result indicate whether a living body exists in the collected set of action images according to an implementation.

As shown in FIG. 5, in one implementation, the action guide information includes mouth shape guide information, and the action image includes a mouth shape image. Step 404 includes the following steps:

Step 502: Extract a mouth shape feature from a mouth shape image.

The action guide information in this implementation is information guiding a user to speak and may be referred to as the mouth shape guide information. When the action image is collected, a lip position may be directly detected, to obtain the action image mainly including a user mouth shape. In one implementation, the action image is a face image. The face image includes a mouth shape image. A mouth of a person is fastened relative to the position of a face. In this way, the mouth shape image in the face image may be directly positioned after the face image is determined.

The mouth shape may also be referred to as a lip shape. A mouth shape of a person may be represented by an inner lip line and an outer lip line of a mouth, and a feature that can reflect change of the inner lip line and/or the outer lip line may be used as a mouth shape feature. Using the inner lip line as an example, when the mouth shape is tightly closing a mouth, the inner lip line is a straight line. When the mouth shape is completely open, the inner lip line is a similar round shape. Therefore, an area of a zone enclosed by the inner lip line may be used as the mouth shape feature, or a distance between left and right boundaries of the inner lip line of the mouth shape and a distance between upper and lower boundaries may be used as the mouth shape feature.

Step 504: Perform matching detection on the extracted mouth shape feature and a preset mouth shape feature corresponding to the action guide information, to obtain the living body detection result indicating whether a living body exists in the collected set of action images.

Specifically, a person may be made in advance to read, at a standard speed, content expressed by the action guide information, the mouth shape image indicating change of the mouth shape in a reading process is collected, and the mouth shape feature is extracted as the preset mouth shape feature and is stored correspond to the action guide information. Before step 504 is executed, the extracted mouth shape feature is compared with the preset mouth shape feature, to perform matching detection. Specifically, similarity between the extracted mouth shape feature and the preset mouth shape feature may be calculated. If the similarity is greater than a similarity threshold, the living body detection result indicating that a living body exists in the collected set of action images is obtained. If the similarity is not greater than the similarity threshold, the living body detection result indicating that a living body does not exist is obtained.

In this implementation, living body detection is performed by guiding a user to change a mouth shape and collecting the mouth shape image. An implementation cost is low, and accuracy is high. In addition, the action image may also include a complete face image, and may be applied to a subsequent identity verification process, improving a resource reusing rate.

In one implementation, a quantity of action images is a preset quantity greater than 1. The identity verification method further includes: collecting a face image included in each action image and performing face identification, and when identification results are not the same, directly obtaining an identity verification result indicating that verification fails. A preset quantity may be set according to needs, for example, be set to 3, 4, or 5. In this implementation, face identification is performed on a face image included in each action image. If a user changes in a living body detection process, it causes that identification results are not the same, and then the identity verification result indicating that verification fails is directly provided. In this way, considering that living body detection takes a period of time, to ensure security, it is necessary to ensure that a same user performs operation in the living body detection process all the time.

In one implementation, if the collected user identity information includes a face image, face identification is performed on a face image included in each action image and a face graph included in the user identity information. When the identification results are not the same, the identity verification result indicating that verification fails is directly obtained.

In one implementation, step 402 includes: displaying the action guide information selected from the preset action guide information library and displaying reading progress information at a speed corresponding to the action guide information. The speed refers to a speed of speaking. Specifically, content expressed by the action guide information may be displayed word by word at the speed, or the whole action guide information may be directly displayed, and a speed progress bar is displayed, so that the speed progress bar changes from a first character of the action guide information according to a corresponding speed.

In one implementation, step 402 includes: playing the action guide information in an audio form at the speed corresponding to the action guide information selected from the preset action guide information library. In this implementation, the action guide information is played at the standard speed, and a user is guided to listen and repeat, so that the user controls change of a mouth shape at the speed, and the terminal 110 collects the corresponding set of action images.

In this implementation, a user is guided to complete mouth shape change required by the action guide information at the standard speed, so as to improve accuracy of living body detection and avoiding invalidation of living body detection resulting from an abnormal speed of the user.

In one implementation, the step of collecting user identity information and performing verification according to the collected user identity information, to obtain a user identity information verification result includes: collecting multiple pieces of the user identity information and separately detecting a user identification corresponding to each piece of the user identity information; and detecting whether user identifications corresponding to the multiple pieces of the user identity information are the same, to obtain the user identity information verification result.

In this implementation, the user identification refers to a character or a character string that can uniquely identify a user. Detection is performed separately by using multiple pieces of user identity information to obtain corresponding user identifications, so as to detect whether these user identifications obtained by detection are all the same. If the user identifications obtained by detection are all the same, an identity information verification result that verification is passed is provided. If the user identifications obtained by detection are not the same, an identity information verification result that verification fails is provided. The identity information verification result detected in this way is more reliable, so that the final identity verification result is more reliable. The user identification herein may be an identity card number, a driving license serial number, a social guarantee card serial code, a passport number, or the like.

As shown in FIG. 6, in one implementation, the step of collecting user identity information and performing verification according to the collected user identity information, to obtain a user identity information verification result includes:

Step 602: Collect a certificate image and perform literal identification on the certificate image, to obtain a user identification matching the certificate image.

Specifically, a client runs on the terminal 110. The client may be an original sound application client or may be a light application client. A light application is an application that can be used without being downloaded. A current common light application uses HTML5 (Hypertext Markup Language Version 5) compilation. The terminal 110 sends the collected certificate image to a server, and the server performs literal identification on the certificate image, to obtain the user identification matching the certificate image.

The terminal 110 calls a camera by using the client running on the terminal 110, to scan a certificate in a photographing or videoing form to obtain the certificate image. The terminal 110 may provide an interaction interface by using the client, to guide a user to scan the certificate according to a prompt. Specifically, a front side of the certificate may be first scanned, and then a back side of the certificate is scanned. Original photos of the front and back sides of the certificate and front-side and back-side certificate images cut according to a certificate shape may be provided in a scanning process. A quantity of the original photos and a quantity of the front-side and back-side certificate images may be separately one, and certainly, may be self-defined according to needs. The terminal 110 may further determine the shape and color distribution of the certificate image, to determine whether the certificate is a forged certificate or determine whether the certificate image is forged.

The server may use an OCR means to perform literal identification on the certificate image, to identify literal information therein. The literal information is then compared with certificate information stored on an external certificate server, to search for matching certificate information, and a corresponding user identification is acquired. The certificate server herein may be an identity card server of a citizen identity management institution, a driving license information server of a vehicle management institution, a social guarantee card information server of a social security guarantee institution, a passport information server of a passport issuing institution, or the like.

The server may further compare the identified literal information and literal information input by the user, to determine whether the identified literal information matches the literal information. If the identified literal information and the literal information are not the same, an identity verification result indicating that identity verification fails is directly provided. In this way, it can be avoided that the user embezzles another person's certificate to perform operation. If identification cannot be performed, a reason why identification cannot be performed may be provided, and a corresponding error prompt is provided.

In one implementation, an input user identification may also be directly acquired. The input user identification herein refers to a user identification input by the user.

Step 604: Collect a face image and calculate similarity between the collected face image and a face image corresponding to the user identification in a face comparison library.

Specifically, if a certificate image exists, and a face comparison library exists, a certificate head portrait in the certificate image is captured, the face image is collected, and the collected face image and a corresponding certificate head portrait are separately compared with a face image corresponding to the user identification in the face comparison library, to obtain similarity by calculation. The similarity herein indicates a similarity degree between corresponding face images.

If no certificate image exists, or no certificate head portrait is captured from the certificate image, only the collected face image is compared with a face image in the face comparison library, to obtain similarity by calculation. In this way, comparison detection may be no longer performed on the external certificate server.

If no face comparison library exists, the collected face image may be compared with the certificate head portrait. At the same time, the collected face image and the certificate head portrait are sent to the external certificate server and are compared, to obtain similarity by calculation.

If no certificate image exists, or no certificate head portrait is captured from the certificate image, and no face comparison library exists, the collected face image may be directly sent to the external certificate server and is compared, to obtain similarity by calculation.

Step 606: Determine a user identity information verification result according to the similarity.

Specifically, if the similarity is higher than the similarity threshold, an identity information verification result indicating that verification is passed is obtained. If the similarity is not higher than the similarity threshold, an identity information verification result indicating that verification fails is obtained. If multiple similarities exist, when each similarity is higher than a corresponding similarity threshold, an identity information verification result indicating that verification is passed is obtained. When a situation in which the similarity does not exceed a corresponding similarity threshold exists, it can be determined that the identity information verification result is that verification fails.

In this implementation, comprehensive verification is performed on the user identity information by combining the certificate image and the collected face image, to make the identity information verification result more accurate, to make the identity verification result more accurate.

In one implementation, before step 402, it is further included: detecting a financial service operation instruction and acquiring the action guide information selected from the preset action guide information library after detecting the financial service operation instruction. After step 406, it is further included: executing a financial service operation corresponding to the financial service operation instruction when the identity verification result is that verification is passed. The financial service herein includes a loan applying service, a credit card online management service, an investment service, and the like. In this implementation, transaction security in the financial service is ensured by means of the foregoing identity verification method, so that management of the financial service is more secure and reliable.

Figure 7:
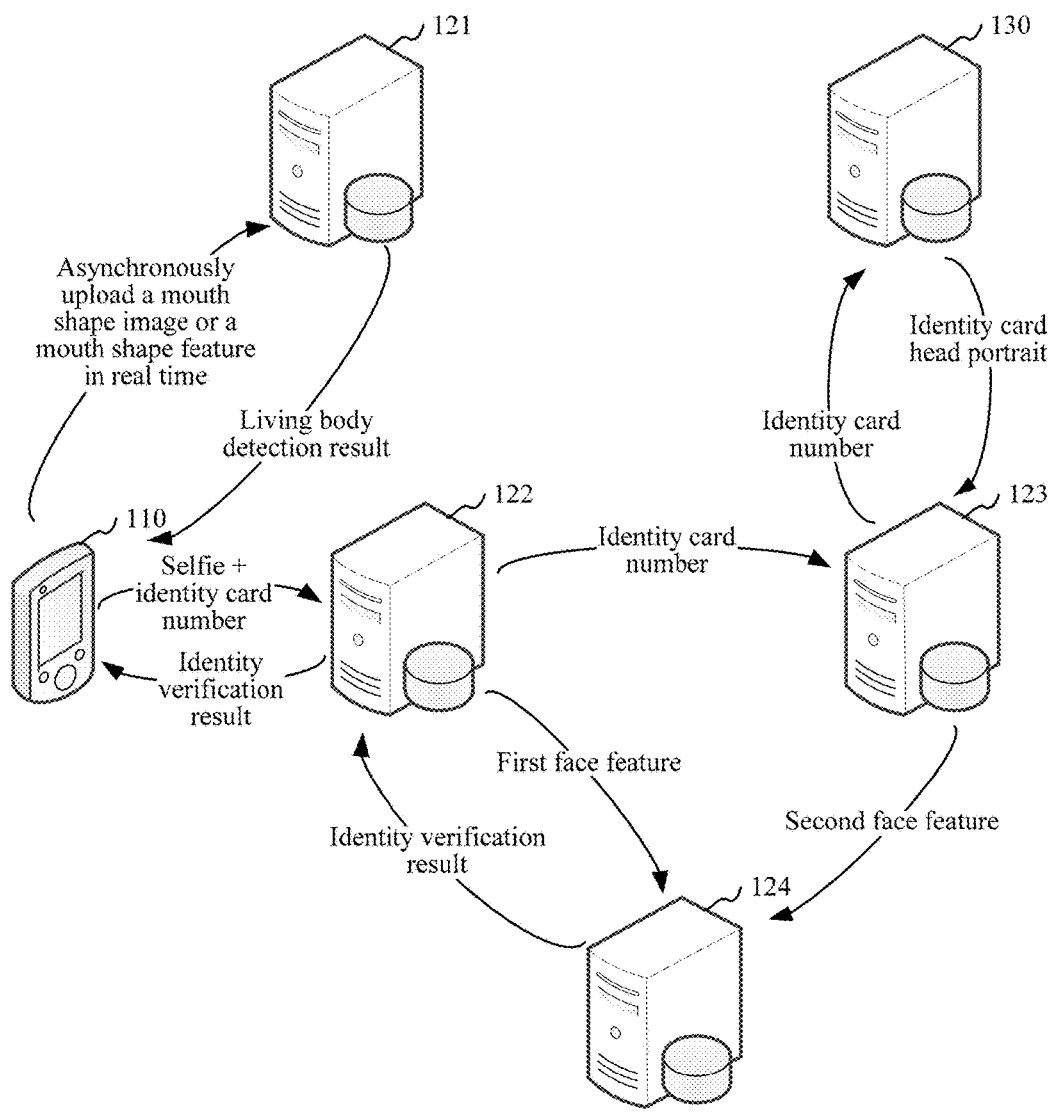
FIG. 7 is a diagram of an application environment of an identity verification system according to an implementation.

As shown in FIG. 7, in one specific implementation, the server 120 includes a lip language living body detection server 121, a first face feature extraction server 122, a second face feature extraction server 123, and a face verification server 124. The lip language living body detection server 121 is connected to the terminal 110. The first face feature extraction server 122 is connected to the terminal 110, the second face feature extraction server 123, and the face verification server 124. The second face feature extraction server 123 is connected to the face verification server 124 and the external certificate server 130. An identity verification method specifically includes the following step 1) to step 5):

Step 1): Lip language living body detection: determine whether a user is a living body by the terminal 110, so as to verify whether a user is performing a video operation or taking a photo of himself.

Step 1) further includes step A) to step B):

Step A): Face detection (Face Detection): detect appearance of a face from various different scenarios and determine a face position. A main objective of face detection is searching for a face zone in the collected image and dividing the image into a face zone and a non-face zone. Therefore, preparation is made for subsequent applications.

Step B): Living body detection (active detection): preselect several short sentences used for determining a user mouth shape. For example, 100 Chinese short sentences within ten characters are selected. The lip language living body detection server 121 analyzes mouth shape features of these short sentences, and the mouth shape features are stored in the lip language living body detection server 121. The terminal 110 randomly selects in a user living body detection page and displays short sentences that need to be read by the user, to remind the user of reading. Based on facial feature location, the terminal 110 collects change of the mouth shape when the user reads the short sentences and compares with the mouth shape feature of the mouth shape change stored in the lip language living body detection server 121, to determine whether the above two are the same, to determine whether the user reads the provided sentences, to determine whether the user is performing operations in real time.

Step 2): Based on step 1), scan the front side and back side of the user identity certificate by collecting a selfie or video face information of the user by using a mobile device.

Step 3): Perform face feature extraction on the collected user face information, scanned identity card photo information, and user identity card photo information stored in an authority by using a facial feature location method, and then calculate similarity between feature information of the above three by using a machine learning algorithm.

Step 3) further includes step a) to step c):

Step a): The facial feature location method is the premise that face features extract main information, and a main objective thereof is positioning face target organ points from the detected face zone. The face target organ points include a face profile, eyebrows, eyes, a nose, and a mouth profile and the position.

Step b): Face feature extraction (Face Representation): based on facial feature location, use a preselected manner to indicate the detected face (including a stock face). A common representation method includes a geometric feature (such as an Euclidean distance), an algebraic feature (a feature matrix), and the like.

Step c): Face identification (Face Identification): Compare a face to be identified with a known face in a database, to obtain correlation between faces.

Step 4): Perform literal identification on user identity card literal information collected by scanning, and then perform similarity calculation with the user identity card literal information having a third-party authority.

Step 5): Determine whether the current user and user information stored in the authority correspond to a same person by combining results of the foregoing steps 3) and 4).

Figure 8:
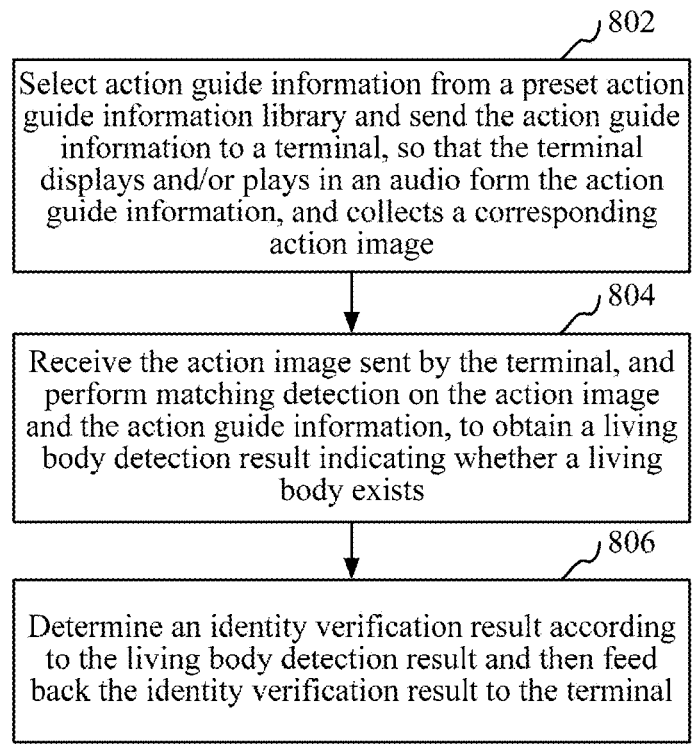
FIG. 8 is a schematic flowchart of an identity verification method according to another implementation.

As shown in FIG. 8, in one implementation, an identity verification method is applied to the server 120 in FIG. 1 and FIG. 2. The identity verification method differs from the identity verification method in the foregoing implementations in that: steps of data input and output in this implementation, such as collecting the action image and the user identity information and displaying and/or playing the action guide information, are executed on the terminal 110. Other steps requiring massive calculation is completed on the server 120. In this way, calculation pressure of the terminal 110 can be prominently reduced, and efficiency of identity verification can be improved. The method includes:

Step 802: Select action guide information from a preset action guide information library and send the action guide information to a terminal 110, so that the terminal 110 displays and/or plays in an audio form the action guide information, and collects a corresponding set of action images.

In one implementation, the terminal 110 displays the action guide information selected from the preset action guide information library and displays reading progress information at a speed corresponding to the action guide information; and/or the terminal 110 plays the action guide information in an audio form at a speed corresponding to the action guide information selected from the preset action guide information library.

Step 804: Receive the action image sent by the terminal, and perform matching detection on the set of action images and the action guide information, to obtain a living body detection result indicating whether a living body exists in the collected set of action images.

In one implementation, the action guide information includes mouth shape guide information. The action image includes a mouth shape image. The performing matching detection on the set of action images and the action guide information, to obtain a living body detection result indicating whether a living body exists in the collected set of action images includes: extracting a mouth shape feature from the mouth shape image; and performing matching detection on the extracted mouth shape feature and a preset mouth shape feature corresponding to the action guide information, to obtain the living body detection result indicating whether a living body exists in the collected set of action images.

In one implementation, a quantity of action images is a preset quantity greater than 1. The identity verification method further includes: collecting a face image included in each action image and performing face identification, and when identification results are not the same, directly obtaining an identity verification result indicating that verification fails.

Step 806: Determine an identity verification result according to the living body detection result and then return the identity verification result to the terminal.

In one implementation, the identity verification method further includes: receiving user identity information collected and sent by the terminal and performing verification according to the collected user identity information, to obtain a user identity information verification result. Step 806 includes: determining the identity verification result according to the user identity information verification result and then returning the identity verification result to the terminal.

In one implementation, the operation of receiving user identity information collected and sent by the terminal and performing verification according to the collected user identity information, to obtain a user identity information verification result includes: receiving multiple pieces of the user identity information collected and sent by the terminal and separately detecting a user identification corresponding to each piece of the user identity information; and detecting whether user identifications corresponding to the multiple pieces of the user identity information are the same, to obtain the user identity information verification result.

In one implementation, the operation of receiving user identity information collected and sent by the terminal and performing verification according to the collected user identity information, to obtain a user identity information verification result includes: receiving a certificate image collected and sent by the terminal, and performing literal identification on the certificate image, to obtain a user identification matching the certificate image; receiving a face image collected and sent by the terminal, and calculating similarity between the collected face image and a face image corresponding to the user identification in a face comparison library; and determining the user identity information verification result according to the similarity.

In one implementation, the receiving a face image collected and sent by the terminal, and calculating similarity between the collected face image and a face image corresponding to the user identification in a face comparison library specifically includes: capturing a certificate head portrait in the certificate image; receiving the face image collected and sent by the terminal; and comparing the collected face image and the corresponding certificate head portrait separately with the face image corresponding to the user identification in the face comparison library, to obtain similarity by calculation.

In one implementation, the operation of determining the identity verification result according to the user identity information verification result includes: when the living body detection result indicates that a living body exists in the collected set of action images, and the user identity information verification result is that verification is passed, determining that the identity verification result is that verification is passed.

In one implementation, before step 802, it is further included: detecting a financial service operation instruction and selecting the action guide information from the preset action guide information library and sending the action guide information to the terminal after detecting the financial service operation instruction. After step 806, it is further included: executing a financial service operation corresponding to the financial service operation instruction when the identity verification result is that verification is passed.

In the foregoing identity verification method, a user is guided in a visual and/or sound manner to complete a corresponding action by displaying and/or playing the action guide information selected from the preset action guide information library, so as to collect the corresponding set of action images. Then matching detection is performed on the collected set of action images and the action guide information, to obtain the living body detection result indicating whether a living body exists in the collected set of action images, so as to obtain the identity verification result according to the living body detection result. In this way, a situation of violent cracking by a machine may be avoided by means of living body detection to verify whether a real user is currently performing operations, to make a final identity verification result more accurate and improve security.

As shown in FIG. 1, an identity verification system 100 includes a terminal 110 and a server 120.

The terminal 110 is configured to receive the action guide information selected from preset action guide information library and sent by the server 120, is further configured to display and/or play in an audio form the action guide information and collect a corresponding set of action images, and is further configured to send the collected set of action images to the server 120.

The preset action guide information library includes various action guide information. A function of the action guide information is guiding a user to make a corresponding action. Action guide information may be randomly selected from the preset action guide information library or may be selected in a confidential selection sequence. The selection sequence is regularly updated.

In one implementation, the action guide information includes an action instruction sequence composed of multiple action instruction units. The action instruction unit herein refers to a minimum action guide unit. One action instruction unit indicates an action. Multiple action instruction units are arranged in sequence to form an action instruction sequence. In this implementation, the action guide information includes an action instruction sequence composed of multiple action instruction units. In this way, a situation in which identity verification is cracked by means of random experiments can be avoided as much as possible, so that a living body detection result is more accurate.

The action guide information may be represented in a visual form, such as in a literal form and in a form of a schematic diagram. The action guide information is played in an audio form. Specifically, audio data of characters or words may be pre-recorded. When the action guide information is played, corresponding audio data in the action guide information is played character by character, or word segmentation may be first performed on the action guide information, and then the action guide information is converted into corresponding audio data by using words as a unit and is played. Certainly, while the action guide information is displayed, the action guide information may be played in an audio form.

While the action guide information is displayed or played, an action image corresponding to the action guide information is collected. The action image herein refers to an image that should include an action made by a user according to the action guide information. Images may be collected at a preset time interval within a display and/or play time segment corresponding to one action instruction unit. An image that is most different from another image collected within the time segment in the collected images or a part of said image is used as the collected set of action images. In one implementation, when movement is detected within view of a camera by means of movement detection, an image is collected by using the camera immediately or after short preset time is waited. The collected image or a part of the collected image is used as the action mage.

The server 120 performs matching detection on the set of action images and the action guide information, to obtain a living body detection result indicating whether a living body exists in the collected set of action images.

Matching detection is performed on two objects, to detect whether the two objects match each other. A degree of matching between the two objects may also be detected. If it is detected that the collected set of action images matches the action guide information, it indicates that a living body exists in the collected set of action images, and the living body detection result indicating that a living body exists in the collected set of action images is obtained. If it is detected that the collected set of action images does not match the action guide information, it indicates that a living body does not exist, and the living body detection result indicating that a living body does not exist is obtained.

The living body detection result may take a value from two preset values. For example, one is used for indicating that a living body exists in the collected set of action images, and zero is used for indicating that a living body does not exist. The living body detection result may also be represented by using a matching value indicating a degree of matching between the collected set of action images and the action guide information. If the matching value exceeds a matching value threshold, it indicates that a living body exists in the collected set of action images. If the matching value does not exceed the matching value threshold, it indicates that a living body does not exist. The matching value herein may be represented by using similarity between the action image and a preset action image corresponding to the action guide information or may be represented by using a value after positive correlation is performed on the similarity. The matching value may also be represented by using an Euclidean distance between the action feature extracted from the action image and a preset action feature corresponding to the action guide information, or may be represented by using a value after positive correlation is performed on the Euclidean distance.

In one implementation, the server 120 is further configured to extract an action feature from the collected set of action images, and perform matching detection on the extracted action feature and a preset action feature corresponding to the action guide information, to obtain the living body detection result whether a living body exists in the collected set of action images.

The server 120 is further configured to determine an identity verification result according to the living body detection result and then return the identity verification result to the terminal 110. The terminal 110 is further configured to receive the identity verification result.

Specifically, in one implementation, the server 120 is configured to determine, when the living body detection result indicates that a living body exists in the collected set of action images, that the identity verification result is that verification is passed. In one implementation, the server 120 is configured to determine, when the living body detection result indicates that a living body does not exist, that the identity verification result is that verification fails. In one implementation, the server 120 may further be configured to obtain the identity verification result according to a combination of the living body detection result and other verification manners.

The foregoing identity verification system 100 guides a user in a visual and/or sound manner to complete a corresponding action by displaying and/or playing the action guide information selected from the preset action guide information library, so as to collect the corresponding set of action images. Then matching detection is performed on the collected set of action images and the action guide information, to obtain the living body detection result indicating whether a living body exists in the collected set of action images, so as to obtain the identity verification result according to the living body detection result. In this way, a situation of violent cracking by a machine may be avoided by means of living body detection to verify whether a real user is currently performing operations, to make a final identity verification result more accurate and improve security.

In one implementation, the terminal 110 is further configured to collect user identity information and send the user identity information to the server 120. The server 120 is further configured to perform verification according to the collected user identity information, to obtain a user identity information verification result, and is further configured to determine the identity verification result according to the living body detection result and the user identity information verification result and then return the identity verification result to the terminal 110.

The user identity information refers to information used for proving a user identity, which includes at least one of a user account, a user password, user certificate information, and user biological feature information. The user biological feature information includes face feature information, fingerprint feature information, iris feature information, a palm geometrical shape, and the like. The certificate information includes a certificate number, a name, the date of birth, an issuing authority, a validity period, and the like. A certificate may be specifically an identity card, a driving license, a social security card, a passport, and the like.

The server 120 may be specifically configured to acquire user identity information input by a user. For example, a character string entered in a user account input box is acquired as a user account, and a character string entered in a user password input box is acquired as a user password. For another example, certificate information input in a certificate information input box is acquired. Collecting the user identity information may also be acquiring the user identity information by calling a camera, a sensor, and the like. For example, a certificate image or a face image is acquired by camera scanning, and the fingerprint feature information, the iris feature information, and the like are obtained by sensor scanning.

The server 120 may be specifically configured to perform verification on the collected user identity information, and specifically perform verification on the collected user identity information. For example, as regards the certificate information, whether a certificate number meets a preset format and whether current time is within a validity period may be determined.

The server 120 may be specifically perform verification according to the collected user identity information, and specifically, perform matching detection on the collected user identity information and prestored user identity information, to obtain the identity information verification result. For example, as regards the user account and the user password, a prestored password corresponding to the user account may be acquired, and whether the collected user password is the same as the prestored password is determined, to obtain the identity information verification result. The identity information verification result is used for indicating whether verification performed according to the collected user identity information is passed.

The server 120 is configured to obtain a final identity verification result by combining the living body detection result and the user identity information verification result. In one implementation, the server 120 is configured to determine that the identity verification result is that verification is passed when the living body detection result indicates that a living body exists in the collected set of action images, and the user identity information verification result is that verification is passed. In one implementation, the server 120 is configured to determine that the identity verification result is that verification fails when the living body detection result indicates that a living body does not exist, and the user identity information verification result is that verification is passed. In one implementation, the server 120 is configured to determine that the identity verification result is that verification fails when the living body detection result indicates that a living body does not exist, and the user identity information verification result is that verification is passed.

In one implementation, the action image includes a mouth shape image. The server 120 is further configured to extract a mouth shape feature from the mouth shape image, and perform matching detection on the extracted mouth shape feature and a preset action feature corresponding to the action guide information, to obtain the living body detection result whether a living body exists in the collected set of action images.

The action guide information in this implementation is information guiding a user to speak and may be referred to as the mouth shape guide information. When the action image is collected, a lip position may be directly detected, to obtain the action image mainly including a user mouth shape. In one implementation, the action image is a face image. The face image includes a mouth shape image. A mouth of a person is fastened relative to the position of a face. In this way, the mouth shape image in the face image may be directly positioned after the face image is determined.

The mouth shape may also be referred to as a lip shape. A mouth shape of a person may be represented by an inner lip line and an outer lip line of a mouth, and a feature that can reflect change of the inner lip line and/or the outer lip line may be used as a mouth shape feature. Using the inner lip line as an example, when the mouth shape is tightly closing a mouth, the inner lip line is a straight line. When the mouth shape is completely open, the inner lip line is a similar round shape. Therefore, an area of a zone enclosed by the inner lip line may be used as the mouth shape feature, or a distance between left and right boundaries of the inner lip line of the mouth shape and a distance between upper and lower boundaries may be used as the mouth shape feature.

Specifically, the server 120 may be configured to make a person in advance to read, at a standard speed, content expressed by the action guide information, the mouth shape image indicating change of the mouth shape in a reading process is collected, and the mouth shape feature is extracted as the preset mouth shape feature and is stored correspond to the action guide information. The server 120 may be specifically configured to: calculate similarity between the extracted mouth shape feature and the preset mouth shape feature; if the similarity is greater than a similarity threshold, obtain the living body detection result indicating that a living body exists in the collected set of action images; and if the similarity is not greater than the similarity threshold, obtain the living body detection result indicating that a living body does not exist.

In this implementation, living body detection is performed by guiding a user to change a mouth shape and collecting the mouth shape image. An implementation cost is low, and accuracy is high. In addition, the action image may also include a complete face image, and may be applied to a subsequent identity verification process, improving a resource reusing rate.

In one implementation, the terminal 110 is further configured to display the action guide information selected from the preset action guide information library and display reading progress information at a speed corresponding to the action guide information. The speed refers to a speed of speaking. Specifically, content expressed by the action guide information may be displayed word by word at the speed, or the whole action guide information may be directly displayed, and a speed progress bar is displayed, so that the speed progress bar changes from a first character of the action guide information according to a corresponding speed.

In one implementation, the terminal 110 is further configured to play the action guide information in an audio form at the speed corresponding to the action guide information selected from the preset action guide information library. In this implementation, the action guide information is played at the standard speed, and a user is guided to listen and repeat, so that the user controls change of a mouth shape at the speed, and the terminal 110 is configured to collect the corresponding set of action images.

In this implementation, a user is guided to complete mouth shape change required by the action guide information at the standard speed, so as to improve accuracy of living body detection and avoiding invalidation of living body detection resulting from an abnormal speed of the user.

In one implementation, a quantity of action images is a preset quantity greater than 1. The terminal 110 is further configured to: collect a face image included in each action image and perform face identification; and when identification results are not the same, directly obtain an identity verification result indicating that verification fails. A preset quantity may be set according to needs, for example, be set to 3, 4, or 5. In this implementation, face identification is performed on a face image included in each action image. If a user changes in a living body detection process, it causes that identification results are not the same, and then the identity verification result indicating that verification fails is directly provided. In this way, considering that living body detection takes a period of time, to ensure security, it is necessary to ensure that a same user performs operation in the living body detection process all the time.

In one implementation, if the collected user identity information includes a face image, the server 120 is further configured to: perform face identification on a face image included in each action image and a face graph included in the user identity information, and when the identification results are not the same, directly obtain the identity verification result indicating that verification fails.

In one implementation, the terminal 110 is further configured to collect multiple pieces of user identity information and send the user identity information to the server 120. The server 120 is further configured to detect a user identification corresponding to each piece of user identity information, and is further configured to detect whether user identifications corresponding to the multiple pieces of user identity information are the same, to obtain the user identity information verification result.

In this implementation, the user identification refers to a character or a character string that can uniquely identify a user. Detection is performed separately by using multiple pieces of user identity information to obtain corresponding user identifications, so as to detect whether these user identifications obtained by detection are all the same. If the user identifications obtained by detection are all the same, an identity information verification result that verification is passed is provided. If the user identifications obtained by detection are not the same, an identity information verification result that verification fails is provided. The identity information verification result detected in this way is more reliable, so that the final identity verification result is more reliable.

In one implementation, the terminal 110 is further configured to collect a certificate image and a face image and send the certificate image and the face image to the server 120. The server 120 is further configured to: perform literal identification on the certificate image, to obtain a user identification matching the certificate image; calculate similarity between the collected face image and a face image corresponding to the user identification in a face comparison library; and determine the user identity information verification result according to the similarity.

Specifically, a client runs on the terminal 110. The client may be an original sound application client or may be a light application client. A light application is an application that can be used without being downloaded. A current common light application uses HTML5 (Hypertext Markup Language Version 5) compilation. The terminal 110 is configured to send the collected certificate image to the server 120. The server 120 is configured to perform literal identification on the certificate image, to obtain the user identification matching the certificate image.

The terminal 110 is configured to call a camera by using the client running on the terminal 110, to scan a certificate in a photographing or videoing form to obtain the certificate image. The terminal 110 may be configured to provide an interaction interface by using the client, to guide a user to scan the certificate according to a prompt. Specifically, a front side of the certificate may be first scanned, and then a back side of the certificate is scanned. Original photos of the front and back sides of the certificate and front-side and back-side certificate images cut according to a certificate shape may be provided in a scanning process. A quantity of the original photos and a quantity of the front-side and back-side certificate images may be separately one, and certainly, may be self-defined according to needs. The terminal 110 may be further configured to determine the shape and color distribution of the certificate image, to determine whether the certificate is a forged certificate or determine whether the certificate image is forged.

The server 120 may be configured to use an OCR means to perform literal identification on the certificate image, to identify literal information therein. The literal information is then compared with certificate information stored on an external certificate server, to search for matching certificate information, and a corresponding user identification is acquired. The certificate server herein may be an identity card server of a citizen identity management institution, a driving license information server of a vehicle management institution, a social guarantee card information server of a social security guarantee institution, a passport information server of a passport issuing institution, or the like.

The server 120 may be further configured to compare the identified literal information and literal information input by the user, to determine whether the identified literal information matches the literal information. If the identified literal information and the literal information are not the same, an identity verification result indicating that identity verification fails is directly provided. In this way, it can be avoided that the user embezzles another person's certificate to perform operation. If identification cannot be performed, a reason why identification cannot be performed may be provided, and a corresponding error prompt is provided.

Specifically, if a certificate image exists, and a face comparison library exists, a certificate head portrait in the certificate image is captured, the face image is collected, and the collected face image and a corresponding certificate head portrait are separately compared with a face image corresponding to the user identification in the face comparison library, to obtain similarity by calculation. The similarity herein indicates a similarity degree between corresponding face images.

If no certificate image exists, or no certificate head portrait is captured from the certificate image, only the collected face image is compared with a face image in the face comparison library, to obtain similarity by calculation. In this way, comparison detection may be no longer performed on the external certificate server.

If no face comparison library exists, the collected face image may be compared with the certificate head portrait. At the same time, the collected face image and the certificate head portrait are sent to the external certificate server and are compared, to obtain similarity by calculation.

If no certificate image exists, or no certificate head portrait is captured from the certificate image, and no face comparison library exists, the collected face image may be directly sent to the external certificate server and is compared, to obtain similarity by calculation.

If the similarity is higher than the similarity threshold, an identity information verification result indicating that verification is passed is obtained. If the similarity is not higher than the similarity threshold, an identity information verification result indicating that verification fails is obtained. If multiple similarities exist, when each similarity is higher than a corresponding similarity threshold, an identity information verification result indicating that verification is passed is obtained. When a situation in which the similarity does not exceed a corresponding similarity threshold exists, it can be determined that the identity information verification result is that verification fails.

In this implementation, comprehensive verification is performed on the user identity information by combining the certificate image and the collected face image, to make the identity information verification result more accurate, to make the identity verification result more accurate.

In one implementation, the server 120 is further configured to capture a certificate head portrait in the certificate image, and separately compare a collected face image and a corresponding certificate head portrait with a face image corresponding to the user identification in the face comparison library, to obtain similarity by calculation.

In one implementation, the server 120 is further configured to determine that the identity verification result is that verification is passed when the living body detection result indicates that a living body exists in the collected set of action images, and the user identity information verification result is that verification is passed.

In one implementation, the terminal 110 is further configured to detect a financial service operation instruction and acquire the action guide information selected from the preset action guide information library after detecting the financial service operation instruction, and is further configured to execute a financial service operation corresponding to the financial service operation instruction when the identity verification result returned by the server 120 is that verification is passed. The financial service herein includes a loan applying service, a credit card online management service, an investment service, and the like. In this implementation, transaction security in the financial service is ensured by means of the foregoing identity verification method, so that management of the financial service is more secure and reliable.

The foregoing identity verification system 100 guides a user in a visual and/or sound manner to complete a corresponding action by displaying and/or playing the action guide information selected from the preset action guide information library, so as to collect the corresponding set of action images. Then matching detection is performed on the collected set of action images and the action guide information, to obtain the living body detection result indicating whether a living body exists in the collected set of action images, so as to obtain the identity verification result according to the living body detection result. In this way, a situation of violent cracking by a machine may be avoided by means of living body detection to verify whether a real user is currently performing operations, to make a final identity verification result more accurate and improve security.

Figure 9:
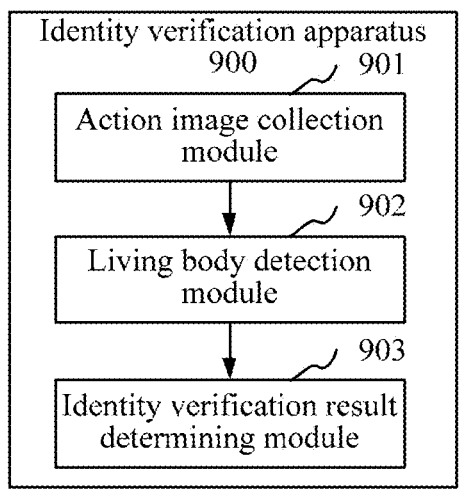
FIG. 9 is a block structural diagram of an identity verification apparatus according to an implementation.

As shown in FIG. 9, in one implementation, an identity verification apparatus 900 is provided, including an action image collection module 901, a living body detection module 902, and an identity verification result determining module 903.

The action image collection module 901 is configured to display and/or play in an audio form action guide information selected from a preset action guide information library, and collect a corresponding set of action images.

The living body detection module 902 is configured to perform matching detection on the collected set of action images and the action guide information, to obtain a living body detection result indicating whether a living body exists in the collected set of action images.

The identity verification result determining module 903 is configured to determine a living body detection result indicating whether a living body exists in the collected set of action images.

Figure 10:
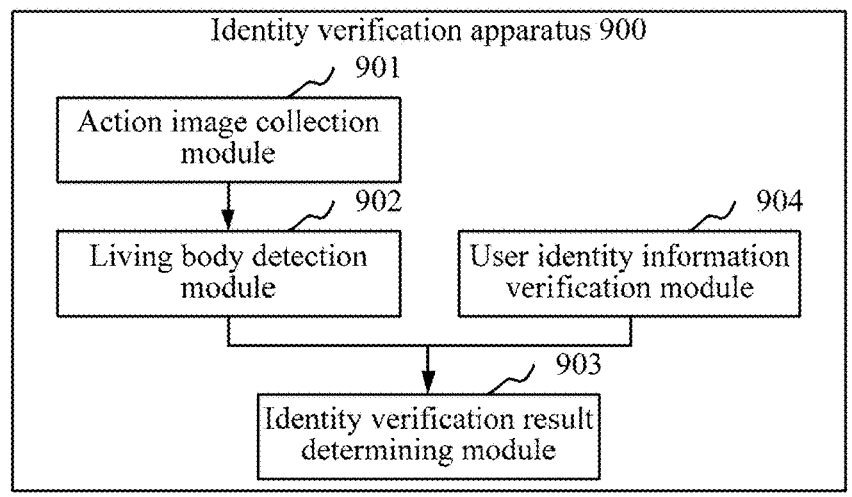
FIG. 10 is a block structural diagram of an identity verification apparatus according to another implementation.

As shown in FIG. 10, in one implementation, the identity verification apparatus 900 further includes a user identity information verification module 904, configured to collect user identity information and perform verification according to the collected user identity information, to obtain a user identity information verification result. The identity verification result determining module 903 is further configured to determine the identity verification result according to the living body detection result and the user identity information verification result.

In one implementation, the action guide information includes mouth shape guide information. The action image includes a mouth shape image. The living body detection module 902 is further configured to extract a mouth shape feature from the mouth shape image, and is further configured to perform matching detection on the extracted mouth shape feature and a preset mouth shape feature corresponding to the action guide information, to obtain the living body detection result indicating whether a living body exists in the collected set of action images.

In one implementation, the action guide information includes mouth shape guide information. The action image collection module 901 is configured to display the action guide information selected from the preset action guide information library and display reading progress information at a speed corresponding to the action guide information.

In one implementation, the action guide information includes mouth shape guide information. The action image collection module 901 is configured to play the action guide information in an audio form at the speed corresponding to the action guide information selected from the preset action guide information library.

In one implementation, a quantity of action images is a preset quantity greater than 1. The user identity information verification module 904 is further configured to: collect a face image included in each action image and perform face identification; and when identification results are not the same, directly obtain an identity verification result indicating that verification fails.

In one implementation, the user identity information verification module 904 is further configured to: collect multiple pieces of the user identity information and separately detect a user identification corresponding to each piece of the user identity information; and detect whether user identifications corresponding to the multiple pieces of the user identity information are the same, to obtain the user identity information verification result.

Figure 11:
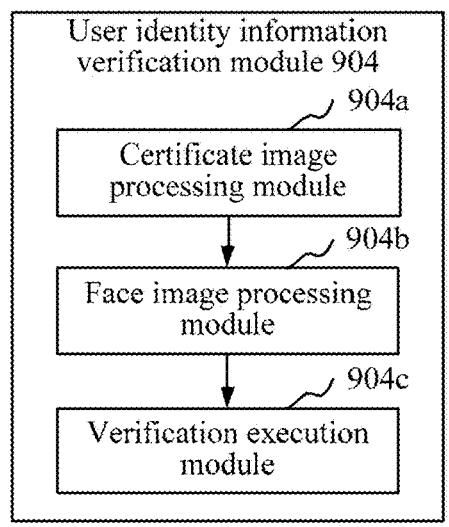
FIG. 11 is a block structural diagram of a user identity information verification module in FIG. 10 according to an implementation.

As shown in FIG. 11, in one implementation, the user identity information verification module 904 includes: a certificate image processing module 904a, a face image processing module 904b, and a verification execution module 904c.

The certificate image processing module 904a is configured to collect a certificate image and perform literal identification on the certificate image, to obtain a user identification matching the certificate image.

The face image processing module 904b is configured to collect a face image and calculate similarity between the collected face image and a face image corresponding to the user identification in the face comparison library.

The verification execution module 904c is configured to determine the user identity information verification result according to the similarity.

Figure 12:
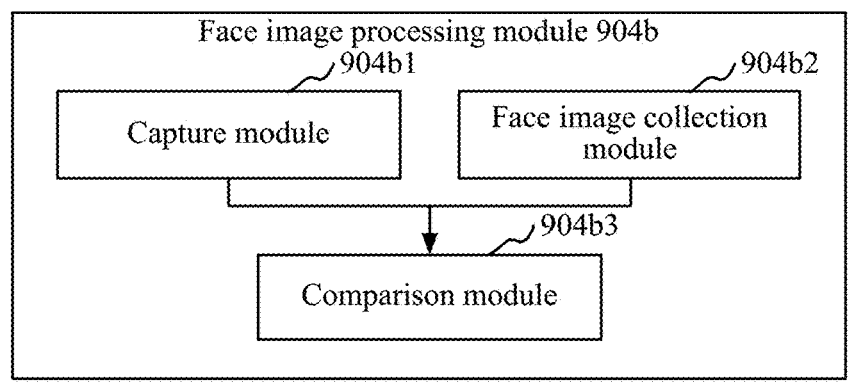
FIG. 12 is a block structural diagram of a face image processing module in FIG. 11 according to an implementation.

As shown in FIG. 12, in one implementation, the face image processing module 904b includes: a capture module 904b1, a face image collection module 904b2, and a comparison module 904b3.

The capture module 904b1 is configured to capture a certificate head portrait in the certificate image.

The face image collection module 904b2 is configured to collect a face image.

The comparison module 904b3 is configured to separately compare the collected face image and a corresponding certificate head portrait with a face image corresponding to the user identification in the face comparison library, to obtain similarity by calculation.

In one implementation, the identity verification result determining module 903 is further configured to determine that the identity verification result is that verification is passed when the living body detection result indicates that a living body exists in the collected set of action images, and the user identity information verification result is that verification is passed.

Figure 13:
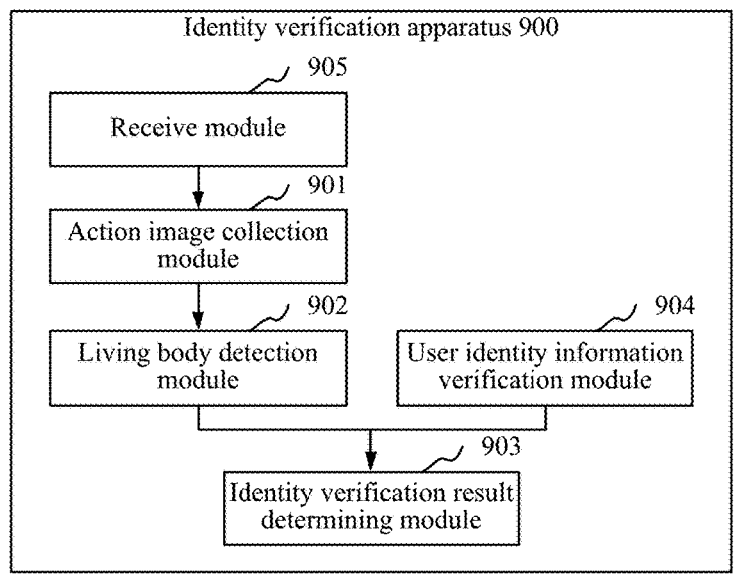
FIG. 13 is a block structural diagram of an identity verification apparatus according to still another implementation.

As shown in FIG. 13, in one implementation, the identity verification apparatus 900 further includes a receiving module 905, configured to receive the action guide information selected from the preset action guide information library and sent by a server.

The living body detection module 902 is further configured to: send the collected set of action images to a server, so that the server performs matching detection on the set of action images and the action guide information, to obtain the living body detection result indicating whether a living body exists in the collected set of action images.

The user identity information verification module 904 is further configured to collect user identity information and send the user identity information to a server, so that the server performs verification according to the collected user identity information, to obtain the user identity information verification result.

The identity verification result determining module 903 is further configured to receive the identity verification result returned after the server determines the identity verification result according to the living body detection result and the user identity information verification result.

Figure 14:
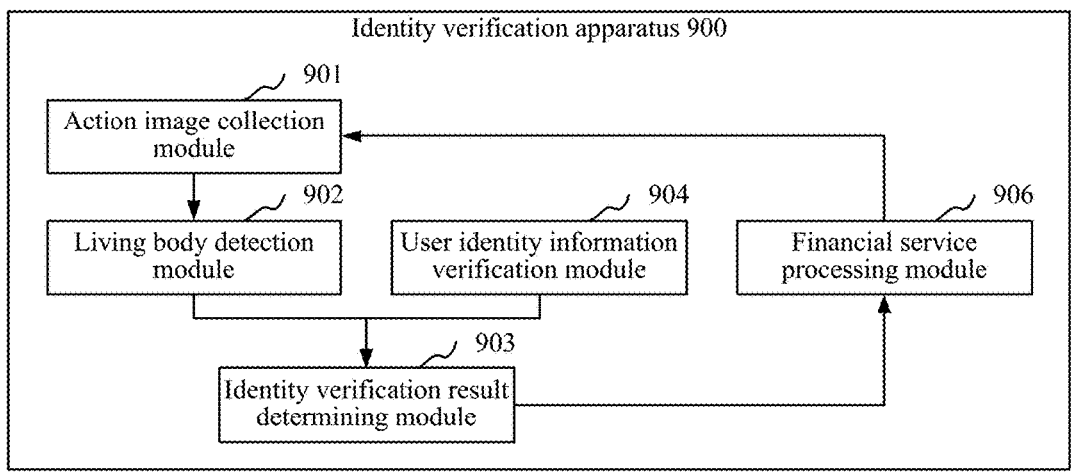
FIG. 14 is a block structural diagram of an identity verification apparatus according to an implementation.

As shown in FIG. 14, in one implementation, the identity verification apparatus 900 further includes a financial service processing module 906, configured to detect a financial service operation instruction and acquire the action guide information selected from the preset action guide information library after detecting the financial service operation instruction, and is further configured to execute a financial service operation corresponding to the financial service operation instruction when the identity verification result is that verification is passed.

In the foregoing identity verification apparatus 900 guides a user in a visual and/or sound manner to complete a corresponding action by displaying and/or playing the action guide information selected from the preset action guide information library, so as to collect the corresponding set of action images. Then matching detection is performed on the collected set of action images and the action guide information, to obtain the living body detection result indicating whether a living body exists in the collected set of action images, so as to obtain the identity verification result according to the living body detection result. In this way, a situation of violent cracking by a machine may be avoided by means of living body detection to verify whether a real user is currently performing operations, to make a final identity verification result more accurate and improve security.

A person of ordinary skill in the art can understand that a whole process or a part of a process in the foregoing implementation methods can be completed by instructing relevant hardware by using a computer program. The program may be stored in a non-transitory computer readable storage medium. When being executed, the program may include processes of the implementations of the foregoing methods. The storage medium may be a nonvolatile storage medium such as a magnetic disk, an optical disc, and a read-only memory (Read-Only Memory, ROM), or a random access memory (Random Access Memory, RAM).

The technical features in the foregoing implementations can be randomly combined. For concision of descriptions, not all possible combinations of the technical features in the foregoing implementations are described. However, as long as the combinations of these technical features are not contradictory, the combinations should all be regarded as the scope disclosed in the specification.

The foregoing implementations only describe several implementation manners of the present disclosure, and their description is specific and detailed, but cannot therefore be understood as a limitation to the patent scope of the present disclosure. It should be noted that a person of ordinary skill in the art may further make variations and improvements without departing from the conception of the present disclosure, and these all fall within the protection scope of the present disclosure Therefore, the patent protection scope of the present disclosure should be subject to the appended claims.

What is claimed is:

1. An identity verification method performed at an electronic device having one or more processors and memory storing a plurality of programs, the method comprising:
    displaying and/or playing in an audio form action guide information selected from a preset action guide information library, and collecting a corresponding set of action images within a preset time window, wherein the action guide information includes mouth shape guide information, and the displaying and/or playing includes displaying the action guide information selected from the preset action guide information library and displaying reading progress information at a speed corresponding to the action guide information;
    performing matching detection on the collected set of action images and the action guide information, to obtain a living body detection result indicating whether a living body exists in the collected set of action images;
    according to the living body detection result that indicates that a living body exists in the collected set of action images:
        collecting user identity information and performing verification according to the collected user identity information, to obtain a user identity information verification result; and
        determining the identity verification result according to the user identity information verification result.

2. The method according to claim 1, wherein the action guide information includes mouth shape guide information, the action image comprises a mouth shape image, and the operation of performing matching detection on the collected set of action images and the action guide information, to obtain a living body detection result indicating whether a living body exists in the collected set of action images comprises:
    extracting a mouth shape feature from the mouth shape image; and
    performing matching detection on the extracted mouth shape feature and a preset mouth shape feature corresponding to the action guide information, to obtain the living body detection result indicating whether a living body exists in the collected set of action images.

3. The method according to claim 1, wherein the operation of displaying and/or playing in an audio form action guide information selected from a preset action guide information library, and collecting a corresponding set of action images comprises:
    playing the action guide information in an audio form at the speed corresponding to the action guide information selected from the preset action guide information library.

4. The method according to claim 1, wherein the operation of collecting user identity information and performing verification according to the collected user identity information, to obtain a user identity information verification result comprises:
    collecting multiple pieces of the user identity information and separately detecting a user identification corresponding to each piece of the user identity information; and
    detecting whether user identifications corresponding to the multiple pieces of the user identity information are the same, to obtain the user identity information verification result.

5. The method according to claim 1, wherein the operation of collecting user identity information and performing verification according to the collected user identity information, to obtain a user identity information verification result comprises:
    collecting a certificate image and performing literal identification on the certificate image, to obtain a user identification matching the certificate image;
    collecting a face image and calculating similarity between the collected face image and a face image corresponding to the user identification in a face comparison library; and
    determining the user identity information verification result according to the similarity.

6. The method according to claim 5, wherein the operation of collecting a face image and calculating similarity between the collected face image and a face image corresponding to the user identification in a face comparison library comprises:
    capturing a certificate head portrait in the certificate image;
    collecting a face image; and
    comparing the collected face image and the corresponding certificate head portrait with the face image corresponding to the user identification in the face comparison library separately, and obtaining the similarity by calculation.

7. The method according to claim 1, the method further comprising:

before displaying and/or playing in the audio form action the guide information:
receiving the action guide information selected from the preset action guide information library and sent by a server.

8. The method according to claim 1, wherein the operation of performing matching detection on the collected set of action images and the action guide information, to obtain a living body detection result indicating whether a living body exists in the collected set of action images comprises:
sending the collected set of action images to a server, so that the server performs matching detection on the set of action images and the action guide information, to obtain the living body detection result indicating whether a living body exists in the collected set of action images.

9. The method according to claim 1, wherein the operation of collecting user identity information and performing verification according to the collected user identity information, to obtain a user identity information verification result comprises:
collecting the user identity information and sending the user identity information to the server, so that the server performs verification according to the collected user identity information and obtains the user identity information verification result.

10. The method according to claim 1, wherein the operation of determining the identity verification result according to the user identity information verification result comprises:
receiving the identity verification result returned by the server after determining the identity verification result according to the user identity information verification result.

11. The method according to claim 1, the method further comprising:
before displaying and/or playing in the audio form the action guide information:
detecting a financial service operation instruction and acquiring the action guide information selected from the preset action guide information library after detecting the financial service operation instruction; and
the method further comprising:
executing a financial service operation corresponding to the financial service operation instruction when the identity verification result is that verification is passed.

12. A terminal, comprising:
a processor;
memory; and
a plurality of programs stored in the memory, wherein the plurality of programs, when executed by the processor, cause the processor to execute the following steps:
displaying and/or playing in an audio form action guide information selected from a preset action guide information library, and collecting a corresponding set of action images within a preset time window, wherein the action guide information includes mouth shape guide information, and the displaying and/or playing includes displaying the action guide information selected from the preset action guide information library and displaying reading progress information at a speed corresponding to the action guide information;
performing matching detection on the collected set of action images and the action guide information, to obtain a living body detection result indicating whether a living body exists in the collected set of action images;

according to the living body detection result that indicates that a living body exists in the collected set of action images:
collecting user identity information and performing verification according to the collected user identity information, to obtain a user identity information verification result; and
determining the identity verification result according to the user identity information verification result.

13. The terminal according to claim 12, wherein the operation of performing matching detection on the collected set of action images and the action guide information, to obtain a living body detection result indicating whether a living body exists in the collected set of action images comprises:
extracting a mouth shape feature from the mouth shape image; and
performing matching detection on the extracted mouth shape feature and a preset mouth shape feature corresponding to the action guide information, to obtain the living body detection result indicating whether a living body exists in the collected set of action images.

14. The terminal according to claim 12, wherein the operation of displaying and/or playing in an audio form action guide information selected from a preset action guide information library, and collecting a corresponding set of action images comprises:
playing the action guide information in an audio form at the speed corresponding to the action guide information selected from the preset action guide information library.

15. The terminal according to claim 12, wherein the operation of collecting user identity information and performing verification according to the collected user identity information, to obtain a user identity information verification result comprises:
collecting multiple pieces of the user identity information and separately detecting a user identification corresponding to each piece of the user identity information; and
detecting whether user identifications corresponding to the multiple pieces of the user identity information are the same, to obtain the user identity information verification result.

16. The terminal according to claim 12, wherein the operation of collecting user identity information and performing verification according to the collected user identity information, to obtain a user identity information verification result comprises:
collecting a certificate image and performing literal identification on the certificate image, to obtain a user identification matching the certificate image;
collecting a face image and calculating similarity between the collected face image and a face image corresponding to the user identification in a face comparison library; and
determining the user identity information verification result according to the similarity.

17. The terminal according to claim 16, wherein the operation of collecting a face image and calculating similarity between the collected face image and a face image corresponding to the user identification in a face comparison library comprises:
capturing a certificate head portrait in the certificate image;
collecting a face image; and comparing the collected face image and the corresponding certificate head portrait with the face image corresponding to the user identification in the face comparison library separately, and obtaining the similarity by calculation.

18. A server, comprising:

a processor;

memory; and a plurality of programs stored in the memory, wherein the plurality of programs, when executed by the processor, cause the processor to execute the following steps:

selecting action guide information from a preset action guide information library, wherein the action guide information includes mouth shape guide information;

sending the action guide information to a terminal;

receiving a set of action images collected and returned by the terminal, wherein the set of action images is collected by the terminal when displaying and/or playing the action guide information in an audio form, the displaying and/or playing includes displaying the action guide information selected from the preset action guide information library and displaying reading progress information at a speed corresponding to the action guide information;

performing matching detection on the set of action images and the action guide information, to obtain a living body detection result indicating whether a living body exists in the collected set of action images;

according to the living body detection result that indicates that a living body exists in the collected set of action images:

receiving user identity information collected and sent by the terminal and performing verification according to the collected user identity information, to obtain a user identity information verification result; and returning the identity verification result to the terminal.

19. The server according to claim 18, wherein the action image comprises a mouth shape image, and the performing matching detection on the set of action images and the action guide information, to obtain a living body detection result indicating whether a living body exists in the collected set of action images comprises:

extracting a mouth shape feature from the mouth shape image; and performing matching detection on the extracted mouth shape feature and a preset mouth shape feature corresponding to the action guide information, to obtain the living body detection result indicating whether a living body exists in the collected set of action images.

* * * * *